United States Patent [19]

Sugiyama et al.

[11] 4,433,127
[45] Feb. 21, 1984

[54] ROOM TEMPERATURE CURABLE SILICONE COMPOSITIONS

[75] Inventors: Iwakichi Sugiyama, Narashino; Kiyoshi Endo, Motono; Yukihisa Takaoka, Ushiku, all of Japan

[73] Assignee: Matsumoto Seiyaku Kogyo Kabushiki Kaisha, Chiba, Japan

[21] Appl. No.: 389,465

[22] Filed: Jun. 17, 1982

[51] Int. Cl.$^3$ .............................................. C08G 77/06
[52] U.S. Cl. ...................................... 528/17; 528/23; 528/33; 528/34
[58] Field of Search ..................... 528/33, 34, 17, 23

[56] References Cited

U.S. PATENT DOCUMENTS 3,796,686  3/1974  Golitz et al. .......................... 528/18
4,345,053  8/1982  Rizk et al. ............................ 528/18

Primary Examiner—Melvyn I. Marquis
Attorney, Agent, or Firm—Wenderoth, Lind & Ponack

[57] ABSTRACT

A room temperature curable silicone composition of one-pack type comprising a silanol-terminated polyorganosiloxane compound, a silyl isocyanate compound and a Ti—O—P bond-containing organic compound has excellent storage stability, short curing time, and excellent physical properties and is not susceptible to discoloration.

6 Claims, 1 Drawing Figure

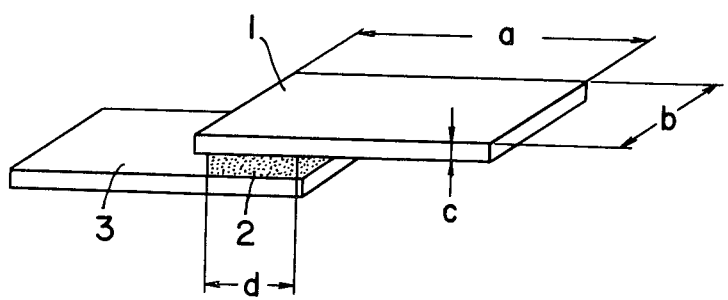

ROOM TEMPERATURE CURABLE SILICONE COMPOSITIONS

BACKGROUND OF THE INVENTION

The present invention relates to a room temperature curable silicone composition. More particularly, the present invention relates to a one-pack, room temperature moisture curable silicone composition.

Various silicone compositions capable of providing a rubber-like elastomer on curing at room temperature are known. Such silicone compositions comprising silanol-terminated polyorganosiloxanes are classified into two types, namely, one-pack type and two-pack type. For convenience of use and workability, the one-pack type silicone composition has been preferably used. It is known that the one-pack type silicone compositions include an acetic acid-evolving type, an alcohol-evolving type and an acetone-evolving type.

The one-pack type room temperature curable silicone composition is usually composed of a silanol-terminated polyorganosiloxane, a crosslinking agent comprising a polyfunctional compound capable of reacting with the silanol-terminated polyorganosiloxane and a curing agent capable of promoting the reaction of the silanol-terminated polyorganosiloxane with the crosslinking agent.

As the crosslinking agent, there are mentioned acyloxysilanes, alkoxysilanes, aminosilanes, isocyanatosilanes and the like. With respect to the curing agent, amines, metallic soaps, metal alkoxides and metal chelates are known. However, these one-pack type room temperature curable silicone compositions are generally unsatisfactory with regard to one or more characteristics among storage stability, curing rate, resultant resin properties, adhesive properties, workability and insusceptibility to discoloration. Particularly, most of these silicone compositions, except for the acetic acid-evolving type, are accompanied by a problem in that the curing is very slow. Also, those which exhibit a high curing rate are likely to violently corrode the surrounding materials and exhibit unsatisfactory adhesion. Therefore, there is still room for improvement.

In order to improve the curing rate and the adhesion of the above-mentioned silicone compositions, Japanese Patent Publication Nos. 3979/1968 and 14196/1970 have proposed a composition comprising a silanol-terminated organopolysiloxane, a crosslinking agent consisting of a monoorganosilylisocyanate and a curing agent selected from the group consisting of amines, metallic soaps and organotin derivatives. These compositions can be cured in a shorter period of time, i.e., about 20 minutes, as compared with the conventional one-pack type room temperature curable silicone compositions.

However, the compositions proposed by these patents are unsatisfactory in storage stability. For example, the composition comprising triethylamine as the curing agent can be stored for a period of about half year, but they become unstable if the storage is further continued. Also, the compositions comprising diamines, metallic soaps, or organotin derivatives exhibit poor storage stability as is readily understood from the fact that these compounds are usually used as a curing agent for a two-pack type room temperature curable composition. Therefore, such compositions are useless for practical purposes. Moreover, during or after the curing procedure, the compositions comprising triethylamine exhibiting fairly good storage stability liberate amines which may result in corrosion of the surrounding materials or give off an offensive odor.

SUMMARY OF THE INVENTION

An object of the present invention is to provide a one-pack type room temperature curable silicone composition which has excellent storage stability, can be cured within a short period of time, exhibits excellent physical properties such as high tensile strength, and is not susceptible to discoloration.

Our research, including experiments have revealed that a Ti—O—P bond-containing organic compound which is prepared by reacting an acid phosphorus compound with a tetravalent titanium organic compound has specific properties with respect to a silyl isocyanate crosslinking agent and that the use of the Ti—O—P bond-containing organic compound is effective for causing the resultant composition to exhibit a better room temperature curing property. This invention is based on these findings.

According to the present invention, briefly summarized, there is provided a room temperature curable silicone composition comprising a silanol-terminated polyorganosiloxane, a silyl isocyanate as a crosslinking agent and a Ti—O—P bond-containing organic compound as a curing agent.

BRIEF DESCRIPTION OF THE DRAWING

In the drawing the single FIGURE is a perspective view of testpieces by which the composition of Example 37 was evaluated for tensile shear strength.

DETAILED DESCRIPTION OF THE INVENTION

The base of the silicone composition of the present invention is a silanol-terminated polyorganosiloxane compound. The silanol-terminated polyorganosiloxane compound usable for the present invention may be any siloxane compounds containing a hydroxyl group bonded to their silicon atom and capable of forming a two-dimensional network. These siloxane compounds contain various organic groups and have various molecular weights and viscosities. The type of the organic group and the molecular weight and the viscosity of the compound may be suitably selected depending on the desired physical properties. If necessary, these compounds may be used in combination of several thereof. Particularly preferable silanol-terminated polyorganosiloxane compounds usable for the present invention are α,ω-dihydroxy-dimethylpolysiloxane and α,ω-dihydroxy-methylphenylpolysiloxane.

The polyorganosiloxane compounds may be prepared by hydrolyzing one of organohalogensiloxanes or a mixture of two or more thereof, or a mixture of one or more organohalogensiloxanes with silicon tetrachloride or an alkylsilicate such as ethylsilicate, by partially or completely alkoxylating an organohalogenosilane and thereafter, hydrolyzing the alkoxylated product, or by reacting sodium silicate with an organohalogenosilane. Alternatively, the polyorganosiloxane compounds may be prepared by hydrolyzing a polyorganosiloxane containing a hydroxyl group, alkoxyl group or a halogen in the presence of an organotrichlorosiloxane or a partially alkoxylated compound thereof.

The silyl isocyanate compound used as a crosslinking agent in the present invention contains, in its molecule, three or more isocyanate groups directly bonded to a silicon atom. For example, the silyl isocyanate compound includes silyl tetraisocyanate of the formula [I]: Si(NCO)$_4$, silyl triisocyanates of the formula [II]: RSi(NCO)$_3$ or the formula [III]: ROSi(NCO)$_3$ and partial condensates of these compounds in which a part of the bond Si—NCO thereof is hydrolyzed. In the above-mentioned formulae, R represents a substituted or unsubstituted hydrocarbon radical, for example, methyl, ethyl, butyl, octyl, stearyl, phenyl, benzyl, cyclohexyl, furfuryl, allyl, propargyl and vinyl which are substituted or unsubstituted with a halogen, amino, acyloxy or (meta)acryloxy group. Examples of the silyl isocyanates having the formula [II] or [III] preferable for the present invention are methylsilyl triisocyanate, phenylsilyl triisocyanate, vinylsilyl triisocyanate, methoxysilyl triisocyanate, butoxysilyl triisocyanate, and phenoxysilyl triisocyanate. The hydrolyzed partial condensates are those which are derived from a compound of the formula Si(NCO)$_4$, RSi(NCO)$_3$ or ROSi(NCO)$_3$ and in which a part of the Si—NCO bonds in the compound is hydrolyzed, and three or more Si—NCO bonds are contained in the molecule. Such condensates may be derived from a condensation between the same compounds or different compounds. Condensates between a compound of the formula [I], [II] or [III] and a compound of the formula R$_2$Si(NCO)$_2$ [IV], R$_3$SiNCO [V], (RO)$_2$Si(NCO)$_2$ [VI] or (RO)$_3$Si(NCO) [VII] in which R is the same as that defined above, may be used. In this case, the condensate should have, in the molecule, three or more isocyanate groups directly bonded to a silicon atom. The above-mentioned compounds or condensates may be used singly or as a mixture of two or more thereof. The compounds of these formulae may be prepared by methods described in Japanese Patent Publication Nos. 3979/1968 and 14196/1970.

Other silyl isocyanate compounds usable in the present invention are partial condensates containing, in the molecule, three or more Si-NCO bonds which are prepared by reacting a compound of the formula Si(NCO)$_4$ [I], RSi(NCO)$_3$ [II], ROSi(NCO)$_3$ [III], R$_2$Si(NCO)$_2$ [IV] or (RO)$_2$Si(NCO)$_2$ [VI], with a compound containing at least one active hydrogen capable of reacting with the NCO group contained in the former compound. The compounds containing an active hydogen include alcohols, organic acids, amines and the like. Examples of these compounds are n-butanol, ethoxyethanol, N,N-diethylaminoethanol, ethylene glycol, propylene glycol, polyethylene thioglycol, polyethylene glycol, glycerol, polyglycerol, pentaerythritol, polyesters, epoxy compounds, polyamides, adipic acid, sebacic acid, citric acid, tartaric acid, terephthalic acid, trimellitic acid, ethylenediamine, hexamethylenediamine, polyethyleneimine, and dihydroxydimethylpolysiloxane. A particularly preferable partial condensate usable in the present invention is one derived from the reaction of ethylene glycol, glycerol or pentaerythritol with phenylsilyl isocyanate.

In the present invention, the silanol-terminated polyorganosiloxane compound and the silyl isocyanate compound are mixed with a Ti—O—P bond-containing organic compound as the curing agent. The Ti—O—P bond-containing organic compound can be prepared by reacting a P—OH bond-containing organic phosphorus compound with a tetravalent titanium organic compound, if necessary, in the presence of a solvent.

A P—OH bond-containing phosphorus compound usable in the present invention may be selected from pentavalent or trivalent acid phosphorus compounds of the formula:

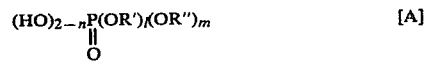 [A]

 [B]

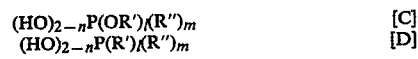 [C]
 [D]

and pyrophosphoric acid compounds containing a P—OH bond and a P—O—P bond which are prepared from the condensation of the above-mentioned acid phosphorus compounds. Also, acid phosphorus compounds of the formula:

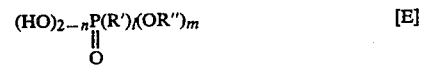 [E]

and condensed pyrophosphoric acid compounds derived from the above-mentioned compounds.

In the above-mentioned formulae [A] through [E], R' and R" each are substituted or unsubstituted hydrocarbon radical, and may be the same as or different from each other. In the formulae [A] through [E], n represents 0 or 1, and l and m are 0, 1 or 2 provided that the sum of 1+m is 1 when n is 0 or 2 when n is 1. As is apparent from the above-mentioned formulae [A] through [E], these acid phosphorus compounds contain a P—R'(P—R") or P—OR'(P—OR") bond in the molecules.

Examples of the acid phosphorus compounds of the formulae [A] through [E] are di-n-butyl acid phosphate, di(2-ethylhexyl) acid phosphate, di-n-hexyl phosphonic acid, di(N,N-diethylaminoethyl) acid phosphate, diphenyl acid phosphinate, dilauryl phosphinic acid, dichloroethyl acid phosphate, dimethacryloxyethyl acid phosphate, and di(2-ethylhexyl) acid pyrophosphate.

The titanium compound which can be reacted with such acid phosphorus compounds is particularly selected from tetravalent titanium organic compounds, for example, tetra-n-butyl titanate, tetra-isopropyl titanate, tetrater-amyl titanate, and tetra-sec-octyl titanate.

A curing agent usable in the present invention is Ti—O—P bond-containing organic compound which is derived from the reaction of the above mentioned pentavalent or trivalent acid phosphorus compound with a tetravalent titanium organic compound. The number of the acid phosphorus compound molecules to be reacted with one molecule of the tetravalent titanium organic compound is 1 or more. This molecule number depends on the intended physical properties and is not limited to a specific value. The Ti—O—P bond-containing organic compound usable in the present invention is suitably selected with consideration of the compatibility or reactivity of the compound with the silanol-terminated polyorganosiloxane base. In view of the compatibility, a compound containing an ester group of the above-mentioned P—OR' bond in the acid phosphorus compound moiety is relatively easy to use. Also, in view of the reactivity, a compound prepared by reacting two or more molecules of the pentavalent acid phosphorus compound with one molecule of the tetravalent titanium compound is generally preferable. It is desirable that the Ti—O—P bond-containing organic compound be preliminarily synthesized. If desired, the acid phosphorus compound and the titanium compound may be separately added to the system, after which these compounds may be reacted together within the system.

As described above, the Ti—O—P bond-containing organic compound is prepared by reacting the acid phosphorus compound with the titanium organic compound previously or in situ. In addition, an adduct which is obtained by coordinating a basic nitrogen compound containing a primary, secondary or tertiary nitrogen atom with the Ti—O—P bond-containing organic compound provides a particularly remarkably high curing rate and is effective for protecting copper and other metals from corrosion. These adducts also are within the scope of the present invention. Examples of such nitrogen compounds are triethylamine, monobutylamine, dibutylamine, N,N-dimethylparatoluidine, pyridine, picoline, morpholine, macrocyclic aminoethers, ethylenediamines, monoethanolamine, diethanolamine, triethanolamine, N-methyldiethanolamine, N,N-dimethylaminopropyltrimethoxide, O-aminoacetophenone, m-N,N-dimethylacetophenone, and N-ethylethoxyethylamine.

Furthermore, another Ti—O—P bond-containing organic compound derived from a compound containing an organic group having a nitrogen atom which is bonded to a phosphoric acid group or a titanium atom can provide a remarkably high curing rate. One example of such a compound is one which is prepared by the use of di(N,N-diethylaminoethyl)acid phosphate as the acid phosphorus compound.

The composition of the present invention comprises a base material comprising the silanol-terminated polyorganosiloxane compound, a crosslinking agent comprising the silyl isocyanate compound and a curing agent comprising the Ti—O—P bond-containing organic compound. In the composition, the crosslinking agent is incorporated in a range of from 0.1 to 30 parts by weight, preferably, from 0.5 to 25 parts by weight, and the curing agent is in a range of from 0.1 to 25 parts by weight, preferably, from 0.5 to 15 parts by weight, per 100 parts by weight of the base material. When the crosslinking agent is less than 0.1 part by weight, the resultant composition has a too low crosslinking density and exhibits unsatisfactory tensile strength and tear strength. An excessive quantity of the crosslinking agent, more than 30 parts by weight, causes the resultant composition to be excessively crosslinked. Also, when the curing agent is less than 0.1 parts by weight, the resultant composition exhibits unsatisfactory curing property. An additional quantity of the curing agent to 25 parts by weight is not only ineffective for increasing the curing property of the composition but also causes the cost of the resultant composition to be excessively high.

The composition of the present invention may contain, in addition to the above mentioned essential components, one or more additives such as fillers, pigments, chain extenders and curing promoters. The filler may be of reinforcing type or non-reinforcing type and is selected from the group consisting of fumed silica, precipitated silica fine powders, silica aerogel, diatomaceous earth, magnesia, mica fine powders and calcium carbonate. The pigment may be selected from the group consisting of iron oxides and lithopone. The chain extender is a compound capable of increasing the molecular weight of a polysiloxane compound having a low viscosity and a low molecular weight and of providing the same effects as those obtained when a polysiloxane having a high molecular weight is originally used. An example of such a compound is a dialkoxysilyldialkyl compound. The curing promotor serves to promote the curing of the composition. The curing promotor includes organotin compounds such as, for example, dibutyltin dilaurate.

In the preparation of the composition of the present invention, the above mentioned essential components and additives are uniformly mixed in the absence of moisture. The composition thus prepared may be used as a solvent-free coating material or as a solvent-containing coating material, an activator or a sealing material with a suitable solvent added thereto. In these cases, it is desirable that the viscosity and molecular weight of the base, polysiloxane compound are suitably adjusted. For example, when the composition is used as the solvent-free coating material, it is preferable that the polysiloxane compound have a low viscosity and a low molecular weight in view of the film-forming property of the coating agent. On the other hand, when the solvent is used, it is desirable that a polysiloxane compound having a high viscosity of 500 centipoises or more at room temperature be used in view of the physical properties of the resultant cured product.

The composition of the present invention comprising the silanol-terminated polyorganosiloxane compound, the silyl isocyanate compound and the Ti—O—P bond-containing organic compound as the base material, the crosslinking agent and the curing agent, respectively, and, optionally, the additives, is a one-pack type room temperature curable composition exhibiting excellent polymerizing property and curing property and which can be rapidly cured and exhibits no increase in viscosity even when stored for three months or more. Thus, it has an excellent storage stability, as compared with the conventional composition containing tertiary amines, metallic soaps or organotin compounds as a curing agent. Furthermore, the composition of the present invention exhibits no yellowing as in the case with a composition containing a titanium compound having no Ti—O—P bond. When the composition of the present invention is practically used as a coating material, a casting material, a filling material or a sealing material, it exhibits a high curing rate and gives off no acetic acid or amine during the curing procedure, as is encountered in the case with the conventional acetic acid-evolving or amine-evolving type composition and exhibits excellent adhesion and resin strength. Therefore, the composition of the present invention is useful for practical purposes.

A typical composition of the present invention comprising a silanol-terminated polydimethylpolysiloxane having a viscosity of 15,000 centipoises at 25° C. as a base material, phenylsilyl triisocyanate as a crosslinking agent, tetrakis(dibutyl phosphate)titanium as a curing agent and calcium carbonate as a filler, exhibits excellent polymerizing property, so that, when the composition is spread on a plate, it dries to a tack-free state in about 10 minutes. In contrast, when a titanium compound containing no Ti—O—P bond, such as titanium alkoxide, titanium chelate or titanium acylate or an acid phosphorus compound alone is used as the curing agent, substantially no effective polymerizing property and curing property can be obtained. This difference is substantially true for storage stability and yellowing.

The reason why the Ti—O—P bond-containing organic compound exhibits such a specific curing action to the silyl isocyanate is not clear. Not wishing to be bound by any theory, we estimate that the specific property is relevant to a change in electron state or bond state of a titanium atom which occurs because of the introduction of the Ti—O—P bond instead of a Ti—O—C bond, in consideration of the fact that the yellowing commonly observed in compositions whose crosslinking is carried out by a titanium compound is decreased as the degree of substitution with a P—O group is increased.

In order to illustrate the present invention in more detail, reference examples, synthesis examples and examples are set forth below. The reference examples illustrate a process for producing a silicone composition not according to the present invention and the properties of the composition produced by the process. The synthesis examples illustrate a process for synthesizing a Ti—O—P bond-containing organic compound which is used as a curing agent for the composition of the present invention. These examples by no means limit the present invention.

REFERENCE EXAMPLE 1

100 parts by weight of $\alpha,\omega$-dihydroxy-dimethylpolysiloxane having a viscosity of 12,500 centistokes at 25° C. and 5 parts by weight of phenylsilyl triisocyanate were introduced into a blender protected from moisture, and the mixture was stirred. The resultant composition was spread on a glass plate to a thickness of about 0.5 mm and left to stand in air at a temperature of 25° C. and a relative humidity of 60%. Even after one week, the coating film did not dry to a tack-free state. Also, when the coating film was further heated at a temperature of 150° C. for 5 hours, it did not dry to a tack-free state.

Furthermore, 1 part by weight of triethylamine was added to the composition and the resultant composition was spread on a glass plate to a thickness of about 0.5 mm. When the coating film was allowed to stand in air at a temperature of 25° C. and a relative humidity of 60%, an hour was necessary for tack-free drying.

REFERENCE EXAMPLE 2

100 parts by weight of $\alpha,\omega$-dihydroxy-dimethylpolysiloxane having a viscosity of 12,500 centistokes at 25° C., 5 parts by weight of phenylsilyl triisocyanate and 1 part by weight of dibutyltin dilaurate were introduced in the order named above into a blender protected from moisture, and the mixture was stirred. This composition gelled during the introduction of the dibutyltin dilaurate.

REFERENCE EXAMPLE 3

100 parts by weight of $\alpha,\omega$-dihydroxy-dimethylpolysiloxane having a viscosity of 12,500 centistokes at 25° C., 5 parts by weight of phenylsilyl triisocyanate and 1 part by weight of di(2-ethylhexyl)acid phosphate were mixed in a manner similar to that described in Reference Example 2. The resultant composition was spread on a glass plate to a thickness of about 0.5 mm. When the coating film was allowed to stand in air at a temperature of 25° C. and a relative humidity of 60%, 7 days were necessary for tack-free drying. About 80 cc of the composition was placed in a closed glass bottle of a capacity of 100 cc and stored at room temperature. After one month, a remarkable increase in viscosity was observed, which indicated poor storage stability of the composition.

REFERENCE EXAMPLES 4 THROUGH 6

In each of the Reference Examples 4 through 6, the same procedures as those described in Reference Example 3 were carried out, except that a titanium compound as indicated in Table 1 was used in place of the di(2-ethylhexyl)acid phosphate.

The tack-free drying of the resultant composition was evaluated in the same manner as that described in Reference Example 1. After a week, the appearance of the cured product was observed to examine yellowing thereof.

The storage stability of the composition was determined in a manner similar to that described in Reference Example 3. A composition exhibiting a remarkable increase in viscosity after three months was judged to be "poor", while a composition exhibiting no substantial increase in viscosity was judged to be "good".

The test results are shown in Table 1, from which it is apparent that the titanium alkoxide provided excellent storage stability but a low curing rate, and the alkoxytitanium chelate and glycoxytitanium chelate provided a high curing rate but an unsatisfactory storage stability. In addition, the cured products of all of the compositions undesirably exhibited a pale yellow color.

TABLE 1

| Reference Example | Titanium compound | Time necessary for tack-free drying | Storage stability | Yellowing of cured product |
| --- | --- | --- | --- | --- |
| 4 | $[CH_3(CH_2)_3O]_4Ti$ | 2 days | good | observed |
| 5 | 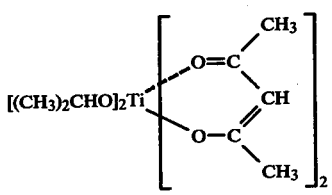 | 7 hours | poor | observed |

TABLE 1-continued

| Reference Example | Titanium compound | Time necessary for tack-free drying | Storage stability | Yellowing of cured product |
|---|---|---|---|---|
| 6 | 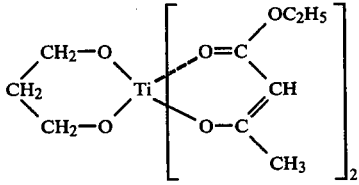 | 7 hours | poor | observed |

SYNTHESIS EXAMPLE 1

0.4 mole (128.96 g) of di(2-ethylhexyl)acid phosphate was dropped into 0.1 mole (28.42 g) of tetraisopropyl titanate placed in a four-neck flask having a capacity of 500 ml while the mixture was stirred. After the reaction was carried out at a temperature of 95° C. for one hour, the isopropyl alcohol thus produced was distilled off. 133.3 g of a pale yellow viscous liquid was obtained.

The results of elemental analysis of the product were in good agreement with those calculated for the formula $[(C_8H_{17}O)_2P(O)O]_4Ti$ as follows.

|  | P | Ti |
|---|---|---|
| Calculated | 9.29% | 3.59% |
| Foubd | 9.34% | 3.60% |

SYNTHESIS EXAMPLE 2

0.3 mole (96.72 g) of di(2-ethylhexyl)acid phosphate was dropped into 0.1 mole (28.42 g) of tetraisopropyl titanate placed in a four-neck flask having a capacity of 500 ml while the mixture was stirred. After the reaction was carried out at a temperature of 95° C. for one hour, the isopropyl alcohol thus produced was distilled off. 107.4 g of a pale yellow viscous liquid was obtained.

The results of elemental analysis of the product were in good agreement with those calculated for the formula $[(C_8H_{17}O)_2P(O)O]_3TiOCH(CH_3)_2$ as follows.

|  | P | Ti |
|---|---|---|
| Calculated | 8.67% | 4.47% |
| Found | 8.64% | 4.45% |

SYNTHESIS EXAMPLES 3 THROUGH 13

Ti—O—P bond-containing organic compounds of varying kind depending on the kinds of the acid phosphorus compound and the titanium organic compound used were synthesized. The results are shown in Table 2.

TABLE 2

| Synthesis Example | Starting Material | | | | Product | | | | |
|---|---|---|---|---|---|---|---|---|---|
| | Titanium Compound Type & Quantity (grams) | | Titanium Compound Type & Quantity (grams) | | Type and Quantity (grams) | | Calculated (%) | | Found (%) |
| | | | | | | | P and Ti % | | |
| 3 | $Ti[OCH(CH_3)_2]_4$ | 28.42 | $[CH_3(CH_2)_3CH-CH_2-O]_2-P-OH$ with $CH_2CH_3$ branch, $=O$ | 64.48 | $[(C_8H_{17}O_2)_2P-O]_2Ti(OC_3H_7)_2$ | 80.88 | P 7.66 Ti 5.95 | | P 7.67 Ti 5.98 |
| 4 | $Ti[OCH(CH_3)_2]_4$ | 28.42 | $[CH_3(CH_2)_3CH-CH_2-O]_2-P-OH$ with $CH_2CH_3$ branch, $=O$ | 32.24 | $(C_8H_{17}O)_2P-OTi(OC_3H_7)_3$, $=O$ | 54.65 | P 5.67 Ti 8.76 | | P 5.64 Ti 8.79 |
| 5 | $Ti[O(CH_2)_3CH_3]_4$ | 34.07 | $[CH_3(CH_2)_2CH_2O]_2P-OH$, $=O$ | 84.08 | $[(C_4H_9O)_2P-O]_4Ti$, $=O$ | 88.46 | P 14.00 Ti 5.41 | | P 14.05 Ti 5.48 |
| 6 | $Ti[O(CH_2)_3CH_3]_4$ | 34.07 | $(ClCH_2CH_2O)_2P-OH$, $=O$ | 93.20 | $[(ClCH_2CH_2O)_2P-O]_4Ti$, $=O$ | 97.56 | P 12.68 Ti 4.91 | | P 12.63 Ti 4.87 |
| 7 | $Ti[OCH(CH_3)_2]_4$ | 28.42 | $(CH_2=C(CH_3)-C(=O)-OC_2H_4O)_2-P-OH$, $=O$ | 64.48 | $[CH_2=C(CH_3)-C(=O)-OC_2H_4O]_2-P-O-Ti$ | | P 5.58 | | P 5.62 |
| | | | $CH_3(CH_2)_2CH_2OP-OH$, $=O$ | 42.04 | $-OPOCH_2(CH_2)_2CH_3]_2$ | 110.88 | Ti 4.32 | | Ti 4.37 |
| 8 | $Ti[OCH(CH_3)_2]_4$ | 28.42 | $[CH_3(CH_2)_2NCH_2CH_2O]_2P-OH$, $=O$ | 116.92 | $\{[(CH_3CH_2)_2NCH_2CH_2O]_2PO\}_4Ti$ | 121.28 | P 10.20 Ti 3.95 | | P 10.14 Ti 4.01 |
| 9 | $Ti[OCH(CH_3)_2]_4$ | 28.42 | $(C_6H_5O)_2POH$ | 93.68 | $[(C_6H_5O)_2P-O]_4Ti$ | 98.06 | P 12.64 Ti 4.88 | | P 12.70 Ti 4.92 |
| 10 | $Ti[OCH(CH_3)_2]_4$ | 28.42 | $[CH_3(CH_2)_5]_2P-OH$, $=O$ | 93.73 | $[(C_6H_{13})_2P-O]_4Ti$, $=O$ | 98.09 | P 12.64 Ti 4.88 | | P 12.70 Ti 4.91 |
| 11 | $Ti[OCH(CH_3)_2]_4$ | 28.42 | $[CH_3(CH_2)_{10}CH_2]_2POH$ | 154.66 | $\{[CH_3(CH_2)_{10}CH_2]_2PO\}_4Ti$ | 159.04 | P 7.76 Ti 3.01 P 14.22 | | P 7.79 Ti 3.03 P 14.28 |
| 12 | $Ti[OCH(CH_3)_2]_4$ | 28.42 | $[CH_3(CH_2)_3CH-CH_2O]_2-P-O-P-OH$ with $CH_2CH_3$, $=O$, $OH$ | 120.42 | $\{[(CH_3(CH_2)_3CH-CH_2O]_2P-O-P(=O)(OH)-O]_3Ti\}$ | 130.81 | Ti 3.66 | | Ti 3.69 |
| 13 | $Ti[OCH(CH_3)_2]_4$ | 28.42 | $CH_3(CH_2)_2CH_2OP-OH$, $=O$, OH | 15.41 | $CH_3(CH_2)_2CH_2OP(=O)(O)_2Ti[OCH(CH_3)_2]_2$ (cyclic) | 31.81 | P 9.74 Ti 15.06 | | P 9.79 Ti 15.12 |

SYNTHESIS EXAMPLE 14

26.66 g of the compound prepared in Synthesis Example 1:

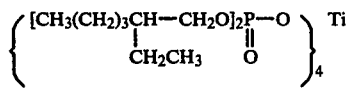

was introduced into a four-neck flask having a capacity of 100 ml under a stream of nitrogen gas. Then, 2.02 g of $(CH_3)_2NCH_2CH_2CH_2CH_3$ was added to the flask. The temperature rose from 20° C. to 60° C. The mixture was further heated to a temperature of 80° C. and maintained at that temperature for one hour. A viscous liquid slightly more yellowish than the compound used as the raw material was obtained.

The determination of nitrogen of the product was in good agreement with that calculated for the formula,

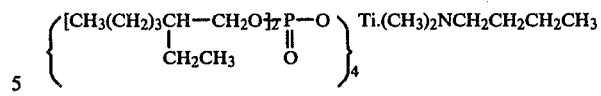

as follows.

| | N |
|---|---|
| Calculated | 0.98% |
| Found | 0.97% |

Synthesis Examples 15 through 20 are shown in Table 3. In Table 3:

① : Type and quantity of the Ti—O—P bond-containing organic compound reacted
② : Type and quantity of the nitrogen compound reacted
③ : Product and yield
④ : N% of the product, calculated
⑤ : N% of the product, found.

TABLE 3

| Synthesis Example | | Type and quantity of starting material and product, elemental analysis | |
|---|---|---|---|
| 15 | ① | $\{[CH_3CH_2)_3CH\!-\!CH_2O]_2\underset{\underset{O}{\|\|}}{P}\!-\!O\}_4Ti$  with $CH_2CH_3$ branch | 26.66 g |
| | ② | $(CH_3)_2NCH_2CH_2CH_2CH_3$ | 4.04 g |
| | ③ | $\{[CH_3(CH_2)_3CH\!-\!CH_2O]_2P(=\!O)\!-\!O\}_4Ti \cdot 2(CH_3)_2N(CH_2)_3CH_3$ with $CH_2CH_3$ branch | 30.70 g |
| | ④ | 1.82% | |
| | ⑤ | 1.83% | |
| 16 | ① | $\{[CH_3(CH_2)_3CH\!-\!CH_2O]_2P(=\!O)\!-\!O\}_4Ti$ with $CH_2CH_3$ branch | 26.66 g |
| | ② | $CH_3CH_2OCH_2CH_2NH_2$ | 3.57 g |
| | ③ | $\{[CH_3(CH_2)_3CH\!-\!CH_2O]_2P(=\!O)\!-\!O\}_4Ti \cdot 2CH_3CH_2OCH_2CH_2NH_2$ with $CH_2CH_3$ branch | 30.23 g |
| | ④ | 1.85% | |
| | ⑤ | 1.86% | |
| 17 | ① | $\{[CH_3(CH_2)_3CH\!-\!CH_2O]_2P(=\!O)\!-\!O\}_4Ti$ with $CH_2CH_3$ branch | 26.66 g |
| | ② | 2-aminoacetophenone (ortho-NH$_2$-C$_6$H$_4$-C(=O)CH$_3$) | 5.14 g |
| | ③ | $\{[CH_3(CH_2)_3CH\!-\!CH_2O]_2P(=\!O)\!-\!O\}_4Ti \cdot 2$ (2-aminoacetophenone) | 32.07 g |
| | ④ | 1.75% | |
| | ⑤ | 1.74% | |
| 18 | ① | $\{[CH_3(CH_2)_3CH\!-\!CH_2O]_2P(=\!O)\!-\!O\}_4Ti$ with $CH_2CH_3$ branch | 26.66 g |
| | ② | $CH_3N(CH_2CH_2OH)_2$ | 4.77 g |

TABLE 3-continued

| Synthesis Example | | Type and quantity of starting material and product, elemental analysis | |
|---|---|---|---|
| | ③ | {[CH$_3$(CH$_2$)$_3$CH(CH$_2$CH$_3$)—CH$_2$O]$_2$P(=O)—O}$_4$Ti·2CH$_3$N(CH$_2$CH$_2$OH)$_2$ | 31.43 g |
| | ④ | 1.78% | |
| | ⑤ | 1.77% | |
| 19 | ① | {[CH$_3$(CH$_2$)$_3$CH(CH$_2$CH$_3$)—CH$_2$O]$_2$P(=O)—O}$_4$Ti | 26.66 g |
| | ② | CH$_3$-C$_6$H$_4$-N(CH$_3$)$_2$ (N,N-dimethyl-p-toluidine) | 5.41 g |
| | ③ | {[CH$_3$(CH$_2$)$_3$CH(CH$_2$CH$_3$)—CH$_2$O]$_2$P(=O)—O}$_4$Ti·2CH$_3$-C$_6$H$_4$-N(CH$_3$)$_2$ | 32.07 g |
| | ④ | 1.75% | |
| | ⑤ | 1.76% | |
| 20 | ① | {[CH$_3$(CH$_2$)$_3$CH(CH$_2$CH$_3$)—CH$_2$O]$_2$P(=O)—O}$_4$Ti | 26.66 g |
| | ② | 2-pyridinecarboxylic acid (C$_5$H$_4$N—COOH) | 4.92 g |
| | ③ | {[CH$_3$(CH$_2$)$_3$CH(CH$_2$CH$_3$)—CH$_2$O]$_2$P(=O)—O}$_4$Ti·2(C$_5$H$_4$N—COOH) | 31.58 g |
| | ④ | 1.77% | |
| | ⑤ | 1.78% | |

EXAMPLES 1 THROUGH 16

In each of the Examples 1 through 16, 100 parts by weight of α, ω-dihydroxydimethylpolysiloxane having a viscosity of 12,500 centistokes at 25° C., 5 parts by weight of the silyl isocyanate compound as indicated in Table 4 and 1 part by weight of the Ti—O—P bond-containing organic compound as prepared in Synthesis Example 1 were introduced into a blender protected from moisture, and the mixture was uniformly stirred. The resultant composition was colorless and clear.

The composition was spread on a glass plate to a thickness of about 0.5 mm. In order to evaluate the tack-free drying of the coating film, the film was allowed to stand in air at a temperature of 25° C. and a relative humidity of 60%. Then, the coating film was further allowed to stand in the same atmosphere for 7 days to completely cure the film. The cured product was evaluated for discoloration. The storage stability of the composition was evaluated in a manner similar to that described in Reference Examples 3 through 6.

The test results are shown in Table 4. It is clear from Table 4 that the composition of the present invention exhibited excellent storage stability to the extent that no increase in viscosity was observed even after a three month's storage. Also, the composition exhibited a remarkably high curing rate and did not yellow after the curing was completed.

TABLE 4

| Example | Silyl isocyanate compound | Time necessary for tack-free drying | Storage stability | Yellowing of a cured product |
|---|---|---|---|---|
| 1 | CH$_3$Si(NCO)$_3$ | 15 min. | good | none |
| 2 | CH$_2$=CHSi(NCO)$_3$ | 15 min. | good | none |

TABLE 4-continued

| Example | Silyl isocyanate compound | Time necessary for tack-free drying | Storage stability | Yellowing of a cured product |
|---|---|---|---|---|
| 3 | C₆H₅—Si(NCO)₃ (phenyl-Si(NCO)₃) | 15 min. | good | none |
| 4 | (OCN)₂Si(C₆H₅)—O—Si(C₆H₅)(NCO)₂ | 10 min. | good | none |
| 5 | Si(NCO)₄ | 1 hr. | good | none |
| 6 | [CH₂OC(O)NH—Si(C₆H₅)(NCO)₂]₂ (bis-carbamate structure) | 10 min. | good | none |
| 7 | CH₃(CH₂)₁₇Si(NCO)₃ | 20 min. | good | none |
| 8 | Cl(CH₂)₄Si(NCO)₃ | 15 min. | good | none |
| 9 | tris[CH₂O—C(O)—NH—Si(C₆H₅)(NCO)₂] (tri-carbamate structure) | 15 min. | good | none |
| 10 | bis[CH₂—NH—C(O)—NH—Si(C₆H₅)(NCO)₂] (bis-urea structure) | 15 min. | good | none |
| 11 | CH₃OSi(NCO)₃ | 10 min. | good | none |
| 12 | n-C₄H₉OSi(NCO)₃ | 25 min. | good | none |
| 13 | C₆H₅—O—Si(NCO)₃ | 25 min. | good | none |
| 14 | n-C₁₈H₃₇OSi(NCO)₃ | 30 min. | good | none |

TABLE 4-continued

| Example | Silyl isocyanate compound | Time necessary for tack-free drying | Storage stability | Yellowing of a cured product |
|---|---|---|---|---|
| 15 | ![structure: 2-chlorophenyl–O–Si(NCO)$_3$] | 15 min. | good | none |
| 16 | $C_2H_5OCH_2CH_2OSi(NCO)_3$ | 15 min. | good | none |

EXAMPLES 17 THROUGH 28

In each of the Examples 17 through 28, 100 parts by weight of α,ω-dihydroxy-dimethylpolysiloxane having a viscosity of 12,500 centistokes at 25° C., 5 parts by weight of phenylsilyl triisocyanate and 1 part by weight of the Ti—O—P bond-containing organic compound as indicated in Table 5 were introduced into a blender protected from moisture, and the mixture was uniformly stirred. The resultant composition was colorless and clear.

The tack-free drying and storage stability of the composition and the discoloration of the cured product after 7 days were evaluated according to the same methods as those described in Examples 1 through 16. The results are shown in Table 5. All of the compositions exhibited excellent storage stability and high curing rate and the cured products were colorless.

TABLE 5

| Example | Ti—O—P bond-containing organic compound | | Time necessary for tack-free drying | Storage stability | Yellowing of cured product |
|---|---|---|---|---|---|
| 17 | $\{[CH_3(CH_2)_3CH(CH_2CH_3)-CH_2O]_2-P(=O)-O\}_3TiOCH(CH_3)_2$ | Synthesis Example 2 | 15 min. | good | none |
| 18 | $\{[CH_3(CH_2)_3CH(CH_2CH_3)-CH_2O]_2-P(=O)-O\}_2Ti[OCH(CH_3)_2]_2$ | Synthesis Example 3 | 18 min. | good | none |
| 19 | $[CH_3(CH_2)_3CH(CH_2CH_3)-CH_2O]_2-P(=O)-O-Ti[OCH(CH_3)_2]_3$ | Synthesis Example 4 | 18 min. | good | none |
| 20 | $\{[CH_3(CH_2)_2CH_2O]_2P(=O)-O\}_4Ti$ | Synthesis Example 5 | 15 min. | good | none |
| 21 | $[(ClCH_2CH_2O)_2P(=O)-O]_4Ti$ | Synthesis Example 6 | 15 min. | good | none |
| 22 | $[(CH_2=C(CH_3)-C(=O)-O-C_2H_4O)_2P(=O)-O]_2Ti[OP(=O)-OCH_2(CH_2)_2CH_3]_2$ | Synthesis Example 7 | 15 min. | good | none |
| 23 | $\{[(CH_3CH_2)_2NCH_2CH_2O]_2P(=O)-O\}_4Ti$ | Synthesis Example 8 | 10 min. | good | none |
| 24 | $[(\text{p-}C_6H_4-O)_2P(=O)-O]_4Ti$ | Synthesis Example 9 | 15 min. | good | none |
| 25 | $\{[CH_3(CH_2)_5]_2P(=O)-O\}_4Ti$ | Synthesis Example 10 | 18 min. | good | none |
| 26 | $\{[CH_3(CH_2)_{10}CH_2]_2PO\}_4Ti$ | Synthesis Example 11 | 15 min. | good | none |
| 27 | $\{[CH_3(CH_2)_3-CH(CH_2CH_3)-CH_2O]_2P(=O)-O-P(=O)(OH)-O\}_3TiOCH(CH_3)_2$ | Synthesis Example 12 | 18 min. | good | none |

TABLE 5-continued

| Example | Ti—O—P bond-containing organic compound | | Time necessary for tack-free drying | Storage stability | Yellowing of cured product |
|---|---|---|---|---|---|
| 28 | 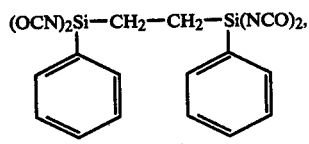 | Synthesis Example 13 | 18 min. | good | none |

EXAMPLES 29 THROUGH 35

In each of the Examples 29 through 35, 100 parts by weight of α,ω-dihydroxy-dimethylpolysiloxane having a viscosity of 12,500 centistokes at 25° C., 5 parts by weight of phenylsilyl triisocyanate and 1 part by weight of the adduct as prepared in each of the Synthesis Examples 14 through 20 were introduced into a blender protected from moisture, and the mixture was uniformly stirred. The resultant composition was colorless and clear.

The tack-free drying and storage stability of the composition and the discoloration of the cured product were evaluated in accordance with the same methods as those described in Examples 1 through 16. The results are shown in Table 6. The compositions all exhibited remarkably high curing rates. Also, these compositions did not substantially corrode copper. The corrosion test was carried out according to the American Army Standard MIL-A-46146.

TABLE 6

| Example | Adduct of TOP* with an amine | Time necessary for tack-free drying | Storage stability | Yellowing of cured product |
|---|---|---|---|---|
| 29 | Adduct of Synthesis Example 14 | 10 min. | good | none |
| 30 | Adduct of Synthesis Example 15 | 8 min. | good | none |
| 31 | Adduct of Synthesis Example 16 | 13 min. | good | none |
| 32 | Adduct of Synthesis Example 17 | 13 min. | good | none |
| 33 | Adduct of Synthesis Example 18 | 10 min. | good | none |
| 34 | Adduct of Synthesis Example 19 | 8 min. | good | none |
| 35 | Adduct of Synthesis Example 20 | 13 min. | good | none |

*The Ti—O—P bond-containing organic compound as prepared in Synthesis Example 1.

EXAMPLE 36

80 parts by weight of α,ω-dihydroxy-dimethylpolysiloxane having a viscosity of 20,000 centistokes at 25° C., 20 parts by weight of α,ω-dihydroxymethylphenylsiloxane having a viscosity of 8,000 centistokes, 3 parts by weight of $$(OCN)_2Si-CH_2-CH_2-Si(NCO)_2,$$

with two phenyl groups attached, 1 part by weight of the Ti—O—P bond-containing organic compound as prepared in Synthesis Example 1 and 15 parts by weight of calcium carbonate were introduced into a blender protected from moisture, and the mixture was uniformly stirred. The same testing procedures as those described in Examples 1 through 16 were applied to the resultant white composition. The time necessary for tack-free drying was 12 minutes, and no change in viscosity after three months occurred. Moreover, the storage stability was good and no yellowing was observed in the cured product after 7 days.

EXAMPLE 37

100 parts by weight of α,ω-dihydroxy-dimethylpolysiloxane having a viscosity of 12,500 centistokes at 25° C., 20 parts by weight of fumed silica having a hydrophobic surface and a specific surface area of 200 m²/g, 5 parts by weight of phenylsilyl triisocyanate and 1 part by weight of the adduct of Synthesis Example 14 were introduced into a blender protected from moisture, and the mixture was uniformly stirred.

The resultant white composition was cast on a glass plate to form a film of a thickness of 2 mm. The film was allowed to stand in air at a temperature of 25° C. and a relative humidity of 60%, thereby to cure the film. After one week, the physical properties of the film were evaluated in accordance with JIS-K-6301 (a method for testing physical properties of vulcanized rubber). The results are shown in Table 7.

TABLE 7

| Test item | Measured value |
|---|---|
| Tensile strength | 15 kg/cm² |
| Elongation | 300% |
| 50% modulus | 4 kg/cm² |
| 100 modulus | 6 kg/cm² |
| Tear strength | 18 kg/cm² |

The adhesive property of the composition with respect to various materials was determined in a manner as indicated in the drawing. In the drawing, the reference numbers 1 and 3 respectively indicate testpieces each in the form of a plate, measuring 100 mm(a)×25 mm(b)×5 mm (in the case of wood and glass) or 2 mm (in other cases) (c). One surface of one of the test-pieces was coated with the composition 2 of the present invention along the length of 10 mm (d) in the longitudinal direction from one end thereof. The testpieces 1, 3 were bonded to each other and pulled in opposite directions, so as to determine the adhesive property of the composition.

After the bonded testpieces were allowed to stand in air at a temperature of 25° C. and a relative humidity of 60% for 3 days, their tensile shear strengths were determined. The results are shown in Table 8. In all cases, adhesive failure occurred, but not interface failure, which indicated excellent adhesive property of the composition.

TABLE 8

| Material | Measured value |
| --- | --- |
| Birch (wood) | 7 kg/cm² |
| Epoxy resin | 7 kg/cm² |
| Polyester resin | 7 kg/cm² |
| Iron | 6 kg/cm² |
| Glass | 6 kg/cm² |
| Aluminum | 6 kg/cm² |

What is claimed is:

1. A room temperature curable silicone composition comprising a silanol-terminated polyorganosiloxane compound selected from the group consisting of siloxane compounds having a hydroxy group bonded to a silicon atom and being capable of forming a two-dimensional network, a silyl isocyanate having three or more isocyanate groups directly bonded to a silicon atom and a Ti—O—P bond-containing organic compound.

2. A composition as claimed in claim 1, wherein said silyl isocyanate compound is of the formula Si(NCO)$_4$, RSi(NCO)$_3$ or ROSi(NCO)$_3$ in which R represents a substituted or unsubstituted hydrocarbon radical.

3. A composition as claimed in claim 1, wherein said silyl isocyanate compound is a partial condensate prepared by partially hydrolyzing the Si—NCO bonds of a compound represented by the formula Si(NCO)$_4$, RSi(NCO)$_3$ or ROSi(NCO)$_3$ in which R represents a substituted or unsubstituted hydrocarbon radical, and which contains three or more Si-NCO bonds in the molecule.

4. A composition as claimed in claim 1, wherein said silyl isocyanate compound is a partial condensate between a compound of the formula Si(NCO)$_4$, RSi(NCO)$_3$, R$_2$Si(NCO)$_2$, ROSi(NCO)$_3$ or (RO)$_2$Si(NCO)$_2$ in which R represents a substituted or unsubstituted hydrocarbon radical, and a compound containing at least one active hydrogen capable of reacting with at least one Si—NCO bond contained in the former compound and which contains three or more Si—NCO bonds in the molecule.

5. A composition as claimed in claim 1, wherein said Ti—O—P bond-containing organic compound is prepared by reacting an acid phosphorus compound represented by the formula

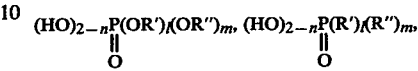

wherein R' and R" each represent a substituted or unsubstituted hydrocarbon radical, n is 0 or 1, and l and m are 0, 1 or 2 provided that the sum of l+m is 1 when n is 0 or 2 when n is 1, or a pyrophosphoric acid compound thereof with a tetravalent titanium organic compound.

6. A composition as claimed in claim 1, wherein said Ti—O—P bond-containing organic compound is obtained by adding a coordinating basic nitrogen compound to a compound which is prepared by reacting an acid phosphorus compound represented by the formula

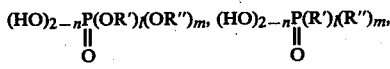
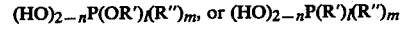

wherein R' and R" each represent a substituted or unsubstituted hydrocarbon radical, n is 0 or 1, and l and m are 0, 1 or 2 provided that the sum of l+m is 1 when n is 0 or 2 when n is 1, or a pyrophosphoric acid compound thereof with a tetravalent titanium organic compound.

* * * * *